(12) United States Patent
Cho et al.

(10) Patent No.: US 11,696,174 B2
(45) Date of Patent: Jul. 4, 2023

(54) WIRELESS COMMUNICATION APPARATUS INCLUDING DATA COMPRESSOR AND OPERATING METHOD OF THE WIRELESS COMMUNICATION APPARATUS

(71) Applicant: SAMSUNG ELECTRONICS CO., LTD., Suwon-si (KR)

(72) Inventors: Sungyoon Cho, Seoul (KR); Joohyun Do, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/925,947

(22) Filed: Jul. 10, 2020

(65) Prior Publication Data
US 2021/0092638 A1    Mar. 25, 2021

(30) Foreign Application Priority Data
Sep. 20, 2019   (KR) .......................... 10-2019-0116357

(51) Int. Cl.
*H04W 28/06*   (2009.01)
*H04L 69/04*   (2022.01)

(52) U.S. Cl.
CPC ............. *H04W 28/06* (2013.01); *H04L 69/04* (2013.01)

(58) Field of Classification Search
CPC . H04L 69/04; H04L 25/0204; H04L 25/0228; H04L 43/12; H04B 7/063; H04B 7/0617; H04W 28/06
See application file for complete search history.

(56) References Cited

U.S. PATENT DOCUMENTS

| | | | |
|---|---|---|---|
| 5,592,586 A * | 1/1997 | Maitra ................... | H04M 1/247 704/219 |
| 6,782,047 B1 | 8/2004 | Le et al. | |
| 9,059,970 B1 | 6/2015 | Joung et al. | |
| 9,104,473 B2 | 8/2015 | Wegener | |
| 9,276,605 B2 | 3/2016 | Xia et al. | |
| 9,553,954 B1 * | 1/2017 | Akhter ................... | H04L 69/04 |
| 9,660,667 B2 | 5/2017 | Kang et al. | |
| 2006/0284747 A1 * | 12/2006 | Moriya ................... | H03M 7/24 341/51 |
| 2007/0136012 A1 * | 6/2007 | Miller ................ | G01R 31/3171 702/67 |

(Continued)

FOREIGN PATENT DOCUMENTS

JP       4575609       11/2010

*Primary Examiner* — Syed Ali
(74) *Attorney, Agent, or Firm* — F. Chau & Associates, LLC

(57) ABSTRACT

A wireless communication apparatus includes a radio frequency integrated circuit (RFIC) configured to receive an input signal to generate a digital sample signal from the input signal, a data compressor configured to compress the digital sample signal according to a compression manner based on a data probability distribution of the input signal varying based on a receivable signal amplitude range of the RFIC, a data decompressor configured to decompress the compressed digital sample signal on the basis of a decompression manner corresponding to the compression manner to generate a decompressed digital sample signal, a data transfer link configured to transfer the compressed digital sample signal to the data decompressor, and a processor configured to process the decompressed digital sample signal.

17 Claims, 14 Drawing Sheets

(56) References Cited

U.S. PATENT DOCUMENTS

| | | | |
|---|---|---|---|
| 2012/0057572 A1* | 3/2012 | Evans | H04J 3/02 370/338 |
| 2012/0078988 A1* | 3/2012 | Miller | G06F 17/16 708/511 |
| 2014/0266872 A1* | 9/2014 | Mitola, III | H04B 7/18521 342/356 |
| 2017/0373890 A1* | 12/2017 | Fertonani | H04L 69/32 |
| 2019/0116518 A1* | 4/2019 | Stojanovski | H04L 67/14 |
| 2019/0173490 A1 | 6/2019 | Lee et al. | |
| 2021/0049451 A1* | 2/2021 | Wang | G06N 3/063 |

* cited by examiner

US 11,696,174 B2

WIRELESS COMMUNICATION APPARATUS INCLUDING DATA COMPRESSOR AND OPERATING METHOD OF THE WIRELESS COMMUNICATION APPARATUS

CROSS-REFERENCE TO RELATED APPLICATION

This U.S. non-provisional patent application claims the benefit of priority under 35 U.S.C. § 119 to Korean Patent Application No. 10-2019-0116357, filed on Sep. 20, 2019, in the Korean Intellectual Property Office, the disclosure of which is incorporated by reference in its entirety herein.

BACKGROUND

1. Technical Field

The inventive concept relates to a wireless communication apparatus including a data compressor for compressing data and an operating method of the wireless communication apparatus.

2. Discussion of Related Art $5^{th}$ generation (5G) technology applied to a wireless communication system is new radio access technology for providing a high-speed data service of several gigabits per second (Gbps) by using an ultra-wide band having a bandwidth of 100 MHz or more compared to conventional long term evolution (LTE) and LTE-advanced (LTE-A). However, since it is difficult to secure an ultra-wide band frequency of 100 MHz or more in a frequency band of hundreds MHz or several GHz, which is used in LTE or LTE-A, a 5G communication system transmits a signal by using a wide frequency band in a frequency band of 6 GHz or more.

Wireless communication apparatuses include a data transfer link for transferring data between internal modules thereof so as to process data received from a base station or another wireless communication apparatus. As a transfer rate of each wireless communication apparatus increases, a data capacity, which is to be transferred through the data transfer link within a certain time, increases. Due to this, a structure of the data transfer link is very complicated, and a size of the data transfer link increases.

SUMMARY

At least one embodiment of the inventive concept provides a wireless communication apparatus including a data compressor for compressing data on the basis of a compression manner suitable for a communication environment or communication performance of the wireless communication apparatus and an operating method of the wireless communication apparatus.

According to an exemplary embodiment of the inventive concept, there is provided a wireless communication apparatus including a radio frequency integrated circuit (RFIC) configured to receive an input signal to generate a digital sample signal from the input signal, a data compressor configured to compress the digital sample signal according to a compression manner based on a data probability distribution of the input signal varying based on a receivable signal amplitude range of the RFIC, a data decompressor configured to decompress a compressed digital sample signal on the basis of a decompression manner corresponding to the compression manner, a data transfer link configured to transfer the compressed digital sample signal to the data decompressor, and a processor configured to process the decompressed digital sample signal.

According to an exemplary embodiment of the inventive concept, there is provided a wireless communication apparatus including a radio frequency integrated circuit (RFIC) configured to receive an input signal to generate a digital sample signal from the input signal, a data compressor configured to select one compression manner from among a plurality of compression manners using a data probability distribution of the input signal and compress the digital sample signal on the basis of the selected compression manner, a data decompressor configured to decompress the compressed digital sample signal on the basis of a decompression manner corresponding to the selected compression manner to generate a decompressed digital sample signal, a data transfer link configured to transfer the compressed digital sample signal to the data decompressor, and a processor configured to process the decompressed digital sample signal.

According to an exemplary embodiment of the inventive concept, there is provided an operating method of a wireless communication apparatus, the operating method including analog-to-digital converting a received input signal into a digital sample signal, compressing the digital sample signal according to a compression manner based on a data probability distribution of the input signal to generate a compressed digital sample signal, transferring the compressed digital sample signal to be processed, decompressing the compressed digital sample signal on the basis of a decompression manner corresponding to the compression manner, and processing the decompressed digital sample signal.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EXEMPLARY EMBODIMENTS

A base station may be a main agent which communicates with a wireless communication apparatus and allocates a communication network resource to the wireless communication apparatus and may be at least one of a cell, a base station (BS), a NodeB (NB), an eNodeB (eNB), a next generation radio access network (NG RAN), a wireless access unit, a base station controller, or a node of a network.

A wireless communication apparatus may be a main agent which communicates with a base station or another wireless communication apparatus and may be referred to as a node, user equipment (UE), next generation UE (NG UE), a mobile station (MS), mobile equipment (ME), a device, or a terminal.

Moreover, a wireless communication apparatus may include at least one of a smartphone, a tablet personal computer (PC), a mobile phone, a video phone, an e-book reader, a desktop PC, a laptop PC, a netbook computer, a personal digital assistant (PDA), an MP3 player, a medical device, a camera, and a wearable device. Moreover, a wireless communication apparatus may be at least one of a television (TV), a digital video disk (DVD) player, an audio player, a refrigerator, an air conditioner, a vacuum cleaner, an oven, a microwave oven, a washer, a dryer, an air purifier, a set-top box, a home automation control panel, a security control panel, a media box (for example, Samsung HomeSync™, Apple TV™, or Google TV™), a gaming console (for example, Xbox™ or PlayStation™), an electronic dictionary, an electronic key, a camcorder, and an electronic picture frame. Moreover, a wireless communication apparatus may be at least one of various medical devices (for example, various portable medical measurement devices (for example, a blood sugar measurer, a heartbeat measurer, a blood pressure measurer, a body temperature measurer, etc.), a magnetic resonance angiography (MRA) device, a magnetic resonance imaging (MRI) device, a computed tomography (CT) device, an imaging device, or an ultrasonic device), a navigation device, a global navigation satellite system (GNSS), an event data recorder (EDR), a flight data recorder (FDR), an automotive infotainment device, a naval electronic device (for example, a naval navigation device, a gyro compass, etc.), an avionic electronic device, a security device, an automotive head unit, an industrial or consumer robot, a drone, an automated teller machine (ATM), a point of sales (POS), and an Internet of things (IoT) device (for example, a bulb, various sensors, a spring cooler device, a fire alarm, a temperature controller, a street lamp post, a toaster, sporting equipment, a hot water tank, a heater, a boiler, etc.). In addition, a wireless communication apparatus may include various kinds of multimedia systems for performing a communication function.

Hereinafter, exemplary embodiments of the inventive concept will be described in detail with reference to the accompanying drawings.

Figure 1:
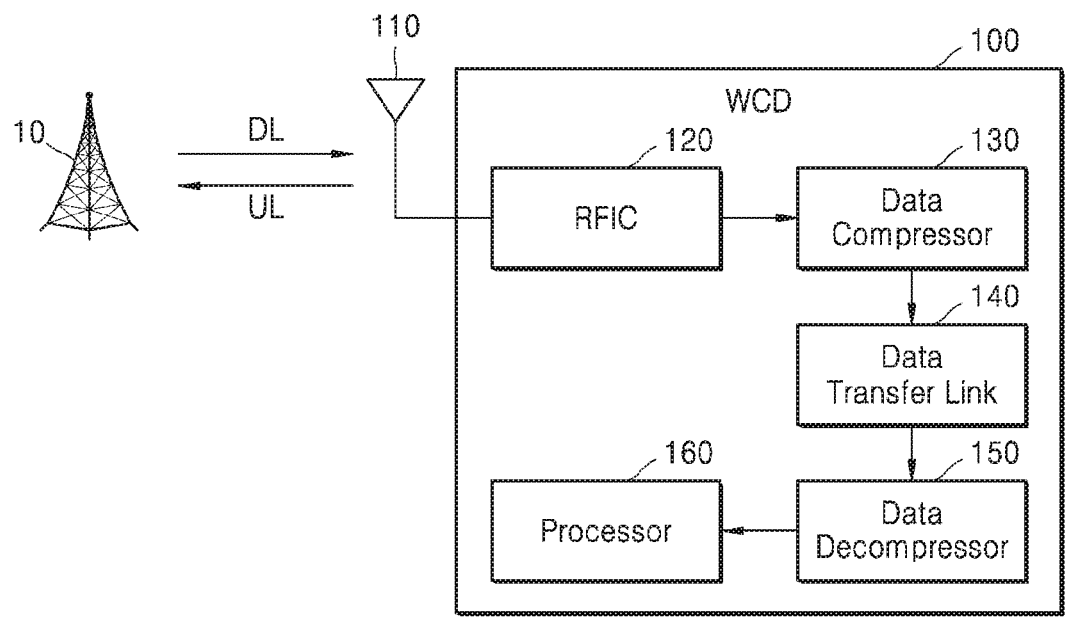
FIG. 1 is a block diagram illustrating a wireless communication system according to an exemplary embodiment of the inventive concept.

FIG. 1 is a block diagram illustrating a wireless communication system 1 according to an exemplary embodiment of the inventive concept.

Referring to FIG. 1, the wireless communication system 1 includes a base station 10 and a wireless communication apparatus 100. In FIG. 1, for convenience of description, the wireless communication apparatus 100 is illustrated as communicating with one base station 10, but is not limited thereto. In other embodiments, the wireless communication apparatus 100 may communicate with a plurality of base stations or a plurality of wireless communication apparatuses, and even in this case, the inventive concept may be applied to the wireless communication apparatus 100. The wireless communication system 1 may be, for example, a long term evolution (LTE) system, a $5^{th}$ generation (5G) system, a code division multiple access (CDMA) system, a global system for mobile communications (GSM) system, a wireless local area network (WLAN) system, or an arbitrary wireless communication system. Hereinafter, the wireless communication system 1 may be assumed to correspond to a 5G communication system, but embodiments of the inventive concept are not limited thereto.

A wireless communication network between the wireless communication apparatus 100 and the base station 10 may support that a plurality of users sharing available network resources to communicate with one another. For example, the wireless communication network may transfer information by using various manners such as code division multiple access (CDMA), frequency division multiple access (FDMA), time division multiple access (TDMA), orthogonal frequency division multiple access (OFDMA), and single carrier frequency division multiple access (SC-FDMA).

The wireless communication apparatus 100 and the base station 10 may communicate with each other through a downlink channel DL and an uplink channel UL. The wireless communication apparatus 100 includes an antenna 110, a radio frequency integrated circuit (RFIC) 120, a data compressor 130, a data transfer link 140 (e.g., a link circuit), a data decompressor 150, and a processor 160. The RFIC 120 may output a digital sample signal, generated by performing analog-to-digital conversion and down-sampling on an input signal received through the antenna 110 from the base station 10, to the data compressor 130. The RFIC may include an analog-to-digital converter (e.g., circuit) for performing the analog-to-digital conversion. The digital sample signal may include a plurality of pieces of digital sample data sorted in a time sequence, and compressing of the digital sample signal may include compressing of each of the plurality of pieces of digital sample data. The digital sample data may include in-phase (I) sample data and quadrature (Q) sample data. The in-phase (I) sample data and the quadrature (Q) sample data may be generated from amplitude module sinusoid signals. The inventive concept may be applied to individually compressing and decompressing the I sample data and the Q sample data.

The data compressor 130 according to an exemplary embodiment compresses the digital sample signal on the basis of a data probability distribution of a variable input signal according to a receivable signal amplitude range of the RFIC 120. For example, according to a beamforming manner set in the RFIC 120, the receivable signal amplitude range of the RFIC 120 may be adjusted based on a factor such as a gain set in each low noise amplifier of the RFIC 120. A variance of the data probability distribution of the input signal may vary based on the receivable signal amplitude range of the RFIC 120, and the data compressor 130 may obtain information about the data probability distribution of the input signal suitable for the receivable signal amplitude range of the RFIC 120, which is currently set. In an exemplary embodiment, information about data probability distributions of the input signal respectively corresponding to various receivable signal amplitude ranges of the RFIC 120 are previously stored in a memory (not shown) of the wireless communication apparatus 100. This will be described below in detail with reference to FIGS. 5A to 5C.

In an exemplary embodiment, the data compressor 130 performs a floating point conversion on the digital sample signal on the basis of the data probability distribution of the input signal to compress the digital sample signal. In the floating point conversion, a data format may include a mantissa region and an exponent region. For example, the mantissa may define the non-zero part of a number (e.g., an amplitude of digital sample signal at a particular time) and the exponent may define how many positions to move the decimal point. A sum of the number of bits of the mantissa region and the number of bits of the exponent region may be less than the number of bits of the digital sample signal before the floating point conversion, and thus, the digital sample signal may be compressed through the floating point conversion. Hereinafter, the data compressor 130 may compress the digital sample signal by performing a conversion operation on the digital sample signal, and thus, a compression operation and a conversion operation of the data compressor 130 may be described as having the same meaning. The mantissa region may further include a sign bit.

In an embodiment, the number of bits of the mantissa region and the number of bits of the exponent region may each be previously set as a combination of minimum values for expressing all values which the digital sample signal may have. The digital sample signal may be expressed as multiplication of bit data of the mantissa region and bit data of the exponent region on the basis of the floating point conversion. For example, assuming that digital sample data of the digital sample signal is 12 bits, bit data of the mantissa region is 8 bits, and bit data of the exponent region is 3 bits, when a value of the digital sample data is '000001000001' (or '65' with respect to a decimal number), the digital sample data may be converted so that a value of the bit data of the mantissa region is '01000001' (or '65' with respect to a decimal number) and a value of the bit data of the exponent region is '000' (or '0' with respect to a decimal number). In this case, a before-conversion value ('65' with respect to a decimal number) of the digital sample data is the same as an after-conversion value ('65' with respect to a decimal number) of the digital sample data.

When a value of the digital sample data is '000100000001' (or '257' with respect to a decimal number), the digital sample data may be converted so that a value of the bit data of the mantissa region is '1000000' (or '64' with respect to a decimal number) and a value of the bit data of the exponent region is '100' (or '4' with respect to a decimal number). In this case, a before-conversion value ('257' with respect to a decimal number) of the digital sample data may be different from an after-conversion value ('256' with respect to a decimal number) of the digital sample data. That is, as a range of values representing the digital sample signal is increased, a value of the bit data of the exponent region may be increased for covering the range, and moreover, a value resolution of the digital sample data after conversion may be decreased.

In an embodiment, the number of bits of the exponent region is determined based on a data probability distribution having a largest variance among a plurality of data probability distributions of the input signal based on a plurality of receivable amplitude ranges of the RFIC 120. In another embodiment, the number of bits of the exponent region dynamically varies based on a variance of the data probability distribution of the input signal, and as the number of bits of the exponent region varies, the number of bits of the mantissa region may vary or may be maintained. For example, as a variance of the data probability distribution of the input signal decreases, the number of bits of the exponent region may decrease, and the number of bits of the mantissa region may increase by the decreased number of bits of the exponent region or may be maintained.

In an embodiment, the data compressor 130 performs floating point conversion on the digital sample data on the basis of a point at which a value of the digital sample data included in the digital sample signal is in the data probability distribution of the input signal. In an exemplary embodiment, the data compressor 130 adjusts a value of the bit data of the exponent region determining a resolution on the basis of a data probability corresponding to a value of the digital sample data to perform a floating point conversion.

In an embodiment, the data compressor 130 compresses the digital sample data on the basis of various compression manners. In a first compression manner, the data compressor 130 performs a least significant bit (LSB) truncation on the digital sample data to generate truncated sample data and performs a floating point conversion on the truncated sample data on the basis of a point at which a value of the truncated sample data corresponding to a result of the performed floating point conversion is in the data probability distribution of the input signal. The first compression manner will be described below in detail with reference to FIGS. 6A and 6B.

In a second compression manner, when an amplitude of a value of the digital sample data is greater than a threshold value, the data compressor 130 selects a first conversion manner from among a plurality of conversion manners, and when the amplitude of the value of the digital sample data is equal to or less than the threshold value, the data compressor 130 selects a second conversion manner from among the plurality of conversion manners. The data compressor 130 may then convert the digital sample data on the basis of the selected conversion manner. In an exemplary embodiment, when an amplitude of a value of the I sample data or an amplitude of a value of the Q sample data in the digital sample data is greater than the threshold value, the data compressor 130 selects the first conversion manner from among the plurality of conversion manners, and when the amplitude of the value of the I sample data and the amplitude of the value of the Q sample data is equal to or less than the threshold value, the data compressor 130 selects the second conversion manner from among the plurality of conversion manners. The threshold value may be set based on the first conversion manner or the second conversion manner. For example, the second conversion manner may be a conversion manner having a resolution which is higher than that of the first conversion manner. That is, when an amplitude of a value of the digital sample data is greater than the threshold value, the first conversion manner where a range of a convertible value is broad is applied despite having a low resolution, and when an amplitude of a value of the digital sample data is equal to or less than the threshold value, the second conversion manner where a range of a convertible value is narrow is applied despite having a high resolution. The second compression manner will be described below in detail with reference to FIGS. 7 to 10. In a third compression manner, the data compressor 130 performs compression on the digital sample data on the basis of a combination of the first compression manner and the second compression manner. The data compressor 130 may perform compression on the digital sample signal on the basis of various compression manners based on the data probability distribution of the input signal, in addition to the first to third compression manners described above. Hereinafter, for convenience of description, an example which uses the first to third compression manners will be mainly described, but the inventive concept is not limited thereto.

In an embodiment, the data compressor 130 may be implemented to support only one of the first to third compression manners described above, or may be implemented to support all of the first to third compression manners. When it is possible to support the first to third compression manners, the data compressor 130 may select an optimal compression manner from among the first to third compression manners on the basis of a current communication environment, a current operation mode, and a currently desired performance value of the wireless communication apparatus 100. Then, the data compressor operates based on the selected optimal compression manner. In an exemplary embodiment, the data compressor 130 selects a compression manner from among the first to third compression manners on the basis of a degree of loss caused by compression and decompression based on the first to third compression manners. This will be described below in detail with reference to FIGS. 11 to 13.

The data transfer link 140 transfers a compressed digital sample signal, received from the data compressor 130, to the data decompressor 150. In an exemplary embodiment, the data transfer link 140 includes a plurality of transfer lines for transferring the compressed digital sample signal. The data compressor 130 may be disposed adjacent to an output terminal of the RFIC 120, and the data decompressor 150 may be disposed adjacent to an input terminal of the processor 160. Therefore, the data transfer link 140 may transfer the digital sample signal received from the RFIC 120 so that the processor 160 processes the digital sample signal.

The data decompressor 150 decompresses the compressed digital sample signal on the basis of a decompression manner corresponding to a compression manner of the data compressor 130 to generate decompressed digital sample signal and provides the decompressed digital sample signal to the processor 160. The processor 160 may process the decompressed digital sample signal.

Each of the data compressor 130 and the data decompressor 150 may be a hardware block including an analog circuit and/or a digital circuit, or may be a software block including a plurality of instructions executed by another processor. Furthermore, each of the data compressor 130 and the data decompressor 150 may be variously implemented by a combination of hardware and software.

The wireless communication apparatus 100 according to an exemplary embodiment performs compression on the digital sample signal on the basis of a data probability distribution of an input signal, and thus, a communication condition or environment of the wireless communication apparatus 100 may be reflected in the compression, Accordingly, an optimal compression may be performed, a structure of a data transfer link for transferring the digital sample signal may be simplified, and a size of the data transfer link or the wireless communication apparatus may be decreased.

Figure 2:
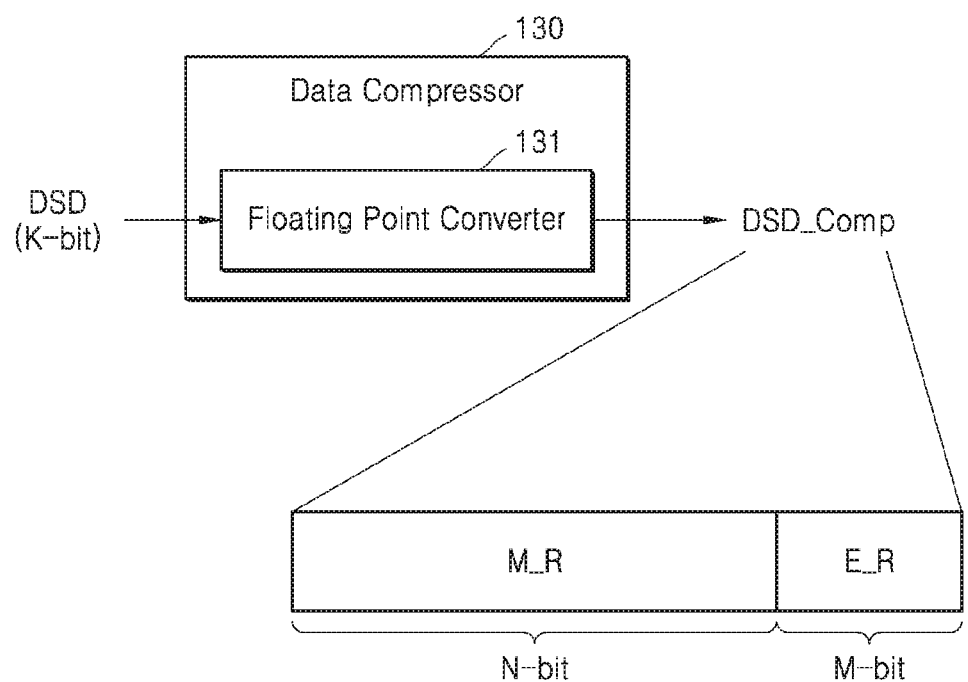
FIGS. 2 to 4 are diagrams for describing an operation of a data compressor performing conversion of a floating point, according to an exemplary embodiment of the inventive concept.
Figure 3:
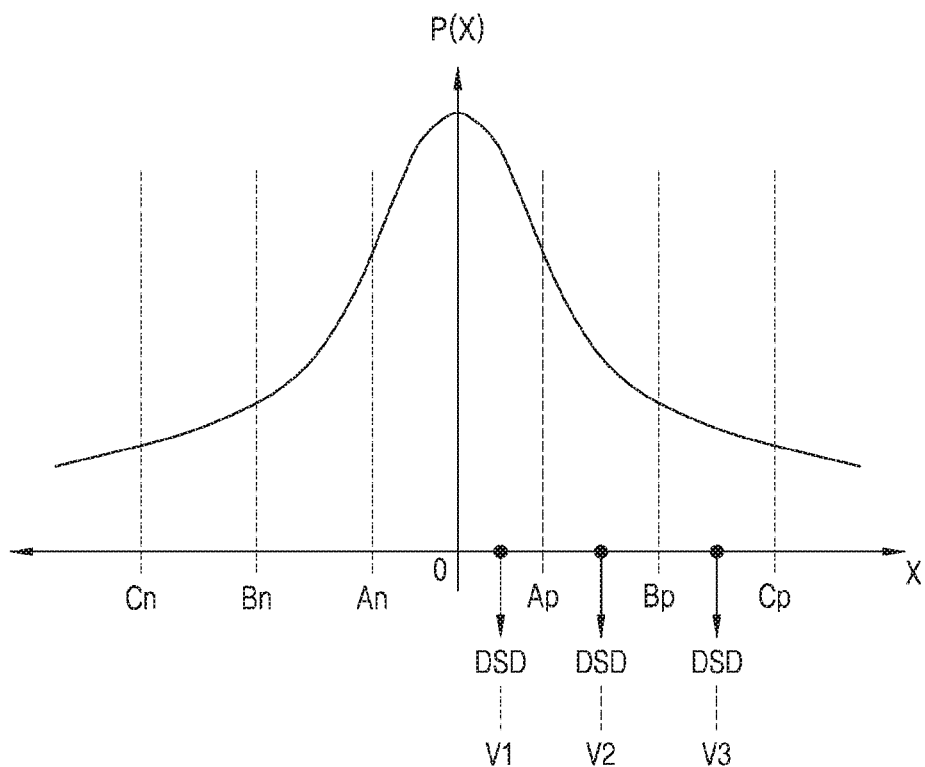
Figure 4:
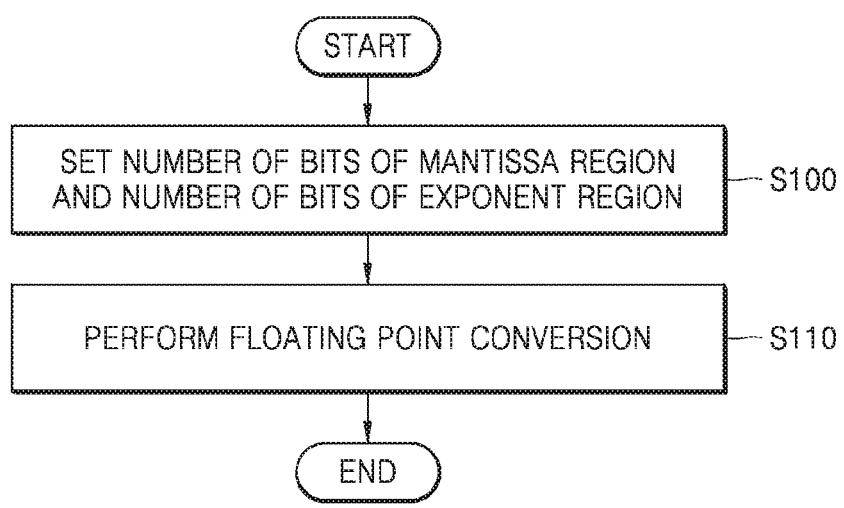
Figure 5A:
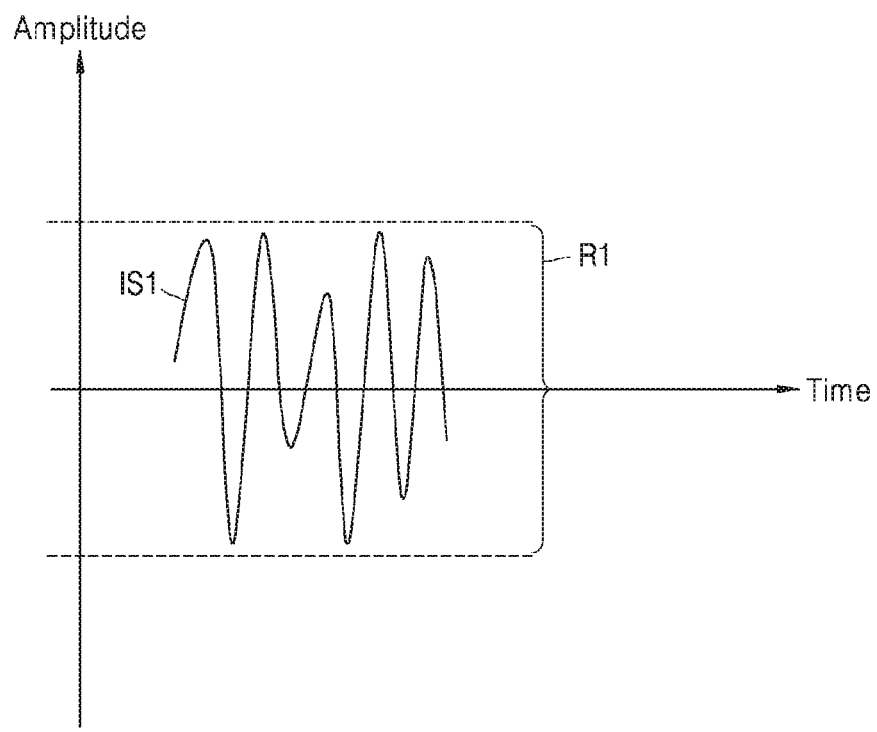
FIGS. 5A to 5C are diagrams for describing a data probability distribution of an input signal used for a compression operation of a data compressor.
Figure 5B:
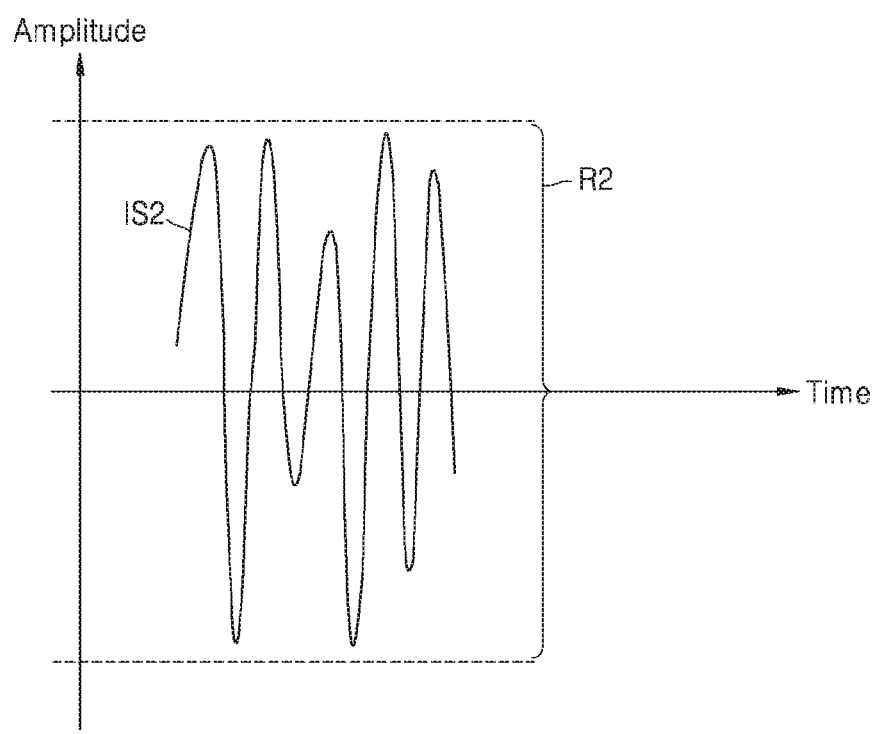
Figure 5C:
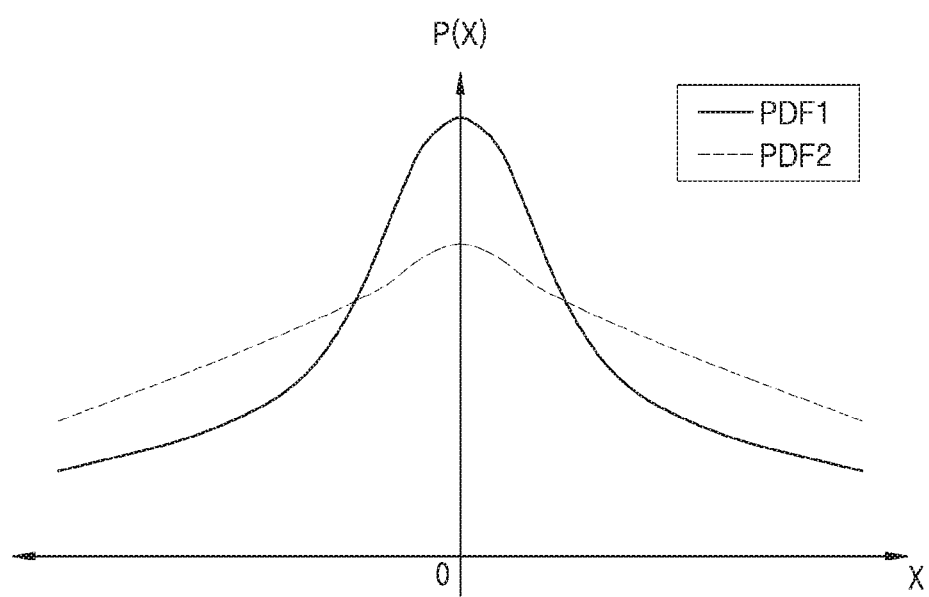

FIGS. 2 to 4 are diagrams for describing an operation of a data compressor 130 performing conversion of a floating point, according to an exemplary embodiment of the inventive concept, and FIGS. 5A to 5C are diagrams for describing a data probability distribution of an input signal used for a compression operation of a data compressor.

Referring to FIG. 2, the data compressor 130 includes a floating point converter 131, and the floating point converter 131 performs a floating point conversion on K-bit (where K is an integer of 1 or more) digital sample data DSD to output converted digital sample data DSD_Comp. The converted digital sample data DSD_Comp includes an N-bit (where N is an integer of 1 or more) mantissa region M_R and an M-bit (where M is an integer of 1 or more) exponent region E_R, and a sum of N and M is set to be less than K. A value of N and a value of M may be previously set based on a range of values which the digital sample data DSD may have. The range of the values which the digital sample data DSD may have may vary based on a receivable signal amplitude range of an RFIC (120 of FIG. 1), and in another embodiment, a value of N and a value of M may be previously set based on the receivable signal amplitude range of the RFIC (120 of FIG. 1).

Referring further to FIG. 3, in terms of a characteristic of wireless communication, a data probability distribution (where the X axis represents a value of data and the Y axis represents a probability value P(X) corresponding to the value of the data) of an input signal of a wireless communication apparatus (100 of FIG. 1) may be a Gaussian distribution, and based on the data probability distribution of the input signal, the floating point converter 131 may perform floating point conversion on digital sample data DSD. For example, when a value of the digital sample data DSD is located between 'An' and 'Ap', the floating point converter 131 determines a value of bit data of the exponent region E_R as a first value V1 and determines a value of bit data of the mantissa region M_R based on the first value V1 of the bit data of the exponent region E_R, thereby performing a conversion operation. When the value of the digital sample data DSD is located between 'Bn' and 'An' or between 'Ap' and 'Bp', the floating point converter 131 determines a value of the bit data of the exponent region E_R as a second value V2 and determines a value of the bit data of the mantissa region M_R based on the second value V2 of the bit data of the exponent region E_R, thereby performing a conversion operation. When the value of the digital sample data DSD is located between 'Cn' and 'Bn' or between 'Bp' and 'Cp', the floating point converter 131 determines a value of the bit data of the exponent region E_R as a third value V3 and determines a value of the bit data of the mantissa region M_R based on the third value V3 of the bit data of the exponent region E_R, thereby performing a conversion operation. As described above, based on the data probability distribution of the input signal, the floating point converter 131 determines a small value of the bit data of the exponent region E_R in association with the digital sample data DSD, which is expected to be received more often, and thus, may perform conversion so that a value of the digital sample data DSD is maximally equal to a value of the compressed digital sample data DSD_Comp. Moreover, the floating point converter 131 may determine a largest value of the bit data of the exponent region E_R in association with the digital sample data DSD, which is expected to be received less often, and thus, may cover a value of the digital sample data DSD.

As illustrated in FIG. 3, a criterion (for example, Ap, Bp, Cp, An, Bn, and Cn) for determining a value of the bit data of the exponent region E_R may be previously set based on the data probability distribution of the input signal, and based on a variance of the data probability distribution of the input signal. The criterion may be set identically or differently. The Gaussian distribution of FIG. 3 is merely an example for describing an exemplary embodiment, and the inventive concept is not limited thereto.

Referring further to FIG. 4, in operation S100, the number of bits of the mantissa region and the number of bits of the exponent region are each set. The number of bits of the mantissa region and the number of bits of the exponent region may each be previously set as a combination of minimum values for expressing all values which the digital sample data may have. In an exemplary embodiment, the number of bits of the exponent region is determined based on a data probability distribution having a largest variance among a plurality of data probability distributions of the input signal based on a plurality of receivable amplitude ranges of the RFIC 120. That is, as a variance of a data probability distribution increases, a range of values which the digital sample data may have increases, and thus, based thereon, the number of bits of the exponent region may be set. In another exemplary embodiment, the number of bits of the exponent region dynamically varies based on a variance of the data probability distribution of the input signal, and thus, the number of bits of the mantissa region may vary or may be maintained.

In order to help understand a description of operation S100, referring further to FIGS. 5A to 5C, the RFIC 120 may be set to receive an input signal IS1 having an amplitude within a first signal amplitude range R1 as in FIG. 5A, or may be set to receive an input signal IS2 having an amplitude within a wider second signal amplitude range R2 than the first signal amplitude range R1 as in FIG. 5B. As described above, a receivable signal amplitude range of the RFIC 120 may be adjusted based on factors such as a predetermined beamforming manner and gains set in low noise amplifiers. As illustrated in FIG. 5C, a data probability distribution of the first input signal IS1 may correspond to a first probability distribution function PDF1 having a first variance, and a data probability distribution of the second input signal IS2 may correspond to a second probability distribution function PDF2 having a second variance, which is greater than the first variance. The number of bits of the mantissa region and the number of bits of the exponent region may be set or may vary to be suitable for a data probability distribution characteristic of an input signal.

In operation S110, the floating point converter 131 performs a floating point conversion on the digital sample data to have a data format suitable for the number of bits of the mantissa region and the number of bits of the exponent region, which are set in operation S100.

Figure 6A:
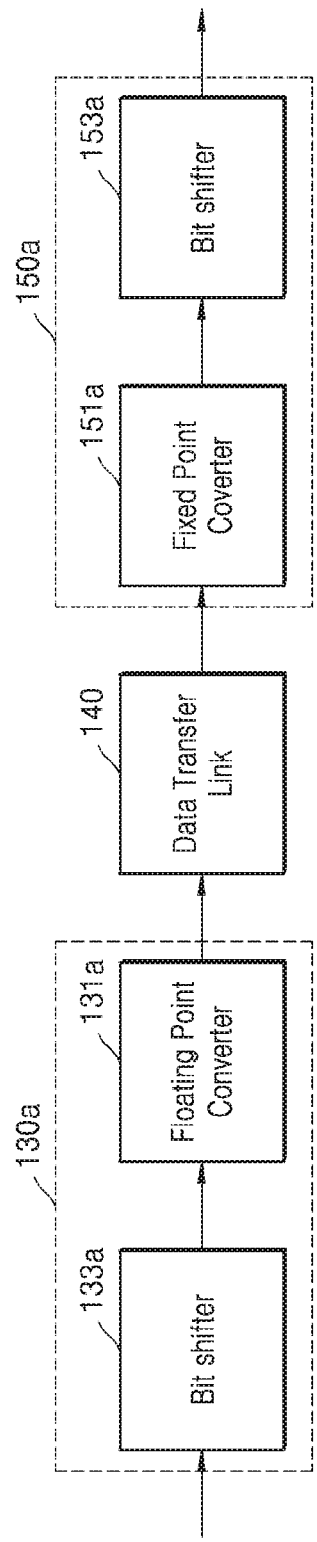
FIG. 6A is a block diagram for describing a data compressor performing a compression operation on the basis of a first compression manner and a data decompressor performing a decompression operation on the basis of a first decompression manner, according to an exemplary embodiment of the inventive concept.
Figure 6B:
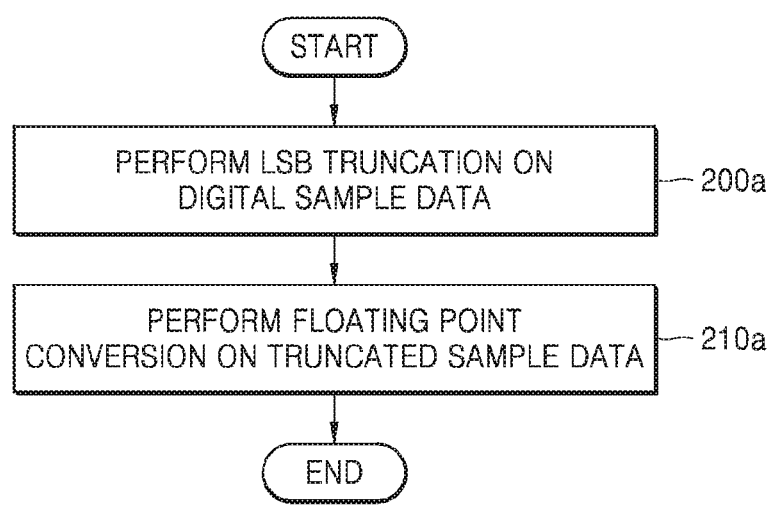
FIG. 6B is a flowchart for describing an operation of the data compressor of FIG. 6A.

FIG. 6A is a block diagram for describing a data compressor 130a performing a compression operation on the basis of the first compression manner and a data decompressor 150a performing a decompression operation on the basis of the first decompression manner, according to an exemplary embodiment of the inventive concept, and FIG. 6B is a flowchart for describing an operation of the data compressor 130a of FIG. 6A. The data compressor 130a may be used to implement the data compressor 130 of FIG. 1. The data decompressor 150a may be used to implement the data decompressor 150 of FIG. 1.

Referring to FIG. 6A, the data compressor 130a compresses digital sample data on the basis of the first compression manner. That is, the data compressor 130a performs LSB truncation on the digital sample data to generate truncated sample data and performs floating point conversion on the truncated sample data to generated compressed digital sample data. The LSB truncation may include setting an LSB bit of the digital sample data to 0, setting the lowermost two LSB bits of the digital sample data to 0, setting the lowermost three LSB bits of the digital sample data to 0, etc. The LSB truncation may include removing an LSB bit of the digital sample, removing the lowermost two LSB bits of the digital sample data, removing the lowermost three LSB bits of the digital sample data, etc. In an exemplary embodiment, the data compressor 130a includes a bit shifter 133a (e.g., a shift circuit) and a floating point converter 131a (e.g., a logic circuit). The bit shifter 133a bit-shifts the digital sample data, received from an RFIC (120 of FIG. 1), by a certain bit in one direction to generate shifted data, and the floating point converter 131a performs a floating point conversion on shifted data output from the bit shifter 133a to generate compressed digital sample data. For example, the bit shifter 133a could perform a right shift of one bit, a right shift of two bits, a right shift of three bits, etc. A data transfer link 140 transfers the digital sample data, compressed by the data compressor 130a, to the data decompressor 150a. The data decompressor 150a performs decompression on the digital sample data compressed by the first decompression manner corresponding to the first compression manner. In an exemplary embodiment, the data decompressor 150a includes a fixed point converter 151a (e.g., a logic circuit) and a bit shifter 153a. The fixed point converter 151a performs an operation of converting a floating point data format into a fixed point data format on compressed digital sample data received from the data transfer link 140, and the bit shifter 153a bit-shifts the fixed point-converted digital sample data by a certain bit in the other direction. For example, if the bit shifter 133a shifted input data to the right by two bits then the bit shifter 153 shifts input data to the left by two bits. Digital sample data decompressed by the data decompressor 150a may be output to a processor (160 of FIG. 1). The embodiment of FIG. 6A corresponds to an exemplary configuration for convenience of description. However, the present embodiment is not limited thereto. Various implementation embodiments for compressing digital sample data by using the above-described first compression manner and decompressing digital sample data by using the above-described first decompression manner may be applied to the data compressor 130a and the data decompressor 150a. The number of bits shiftable by the bit shifter 153a may vary based on an apparatus or a system, to which the inventive concept is applied, and a floating point expression range may be reduced by a shifting operation of the bit shifter 153a, thereby enhancing compression efficiency.

Referring further to FIG. 6B, in operation 200a, the data compressor 130a performs LSB truncation on digital sample data received from an RFIC (120 of FIG. 1) to generate truncated sample data. Subsequently, in operation 210a, the data compressor 130a performs a floating point conversion on the truncated sample data based on a data probability distribution of an input signal to generate compressed digital sample data. Subsequently, the data transfer link 140 transfers digital sample data, compressed by the data compressor 130a, to the data decompressor 150a. In an exemplary embodiment, the data decompressor 150a performs an inverse conversion corresponding to each of operation 200a and operation 210a to decompress the compressed digital sample data.

Figure 7:
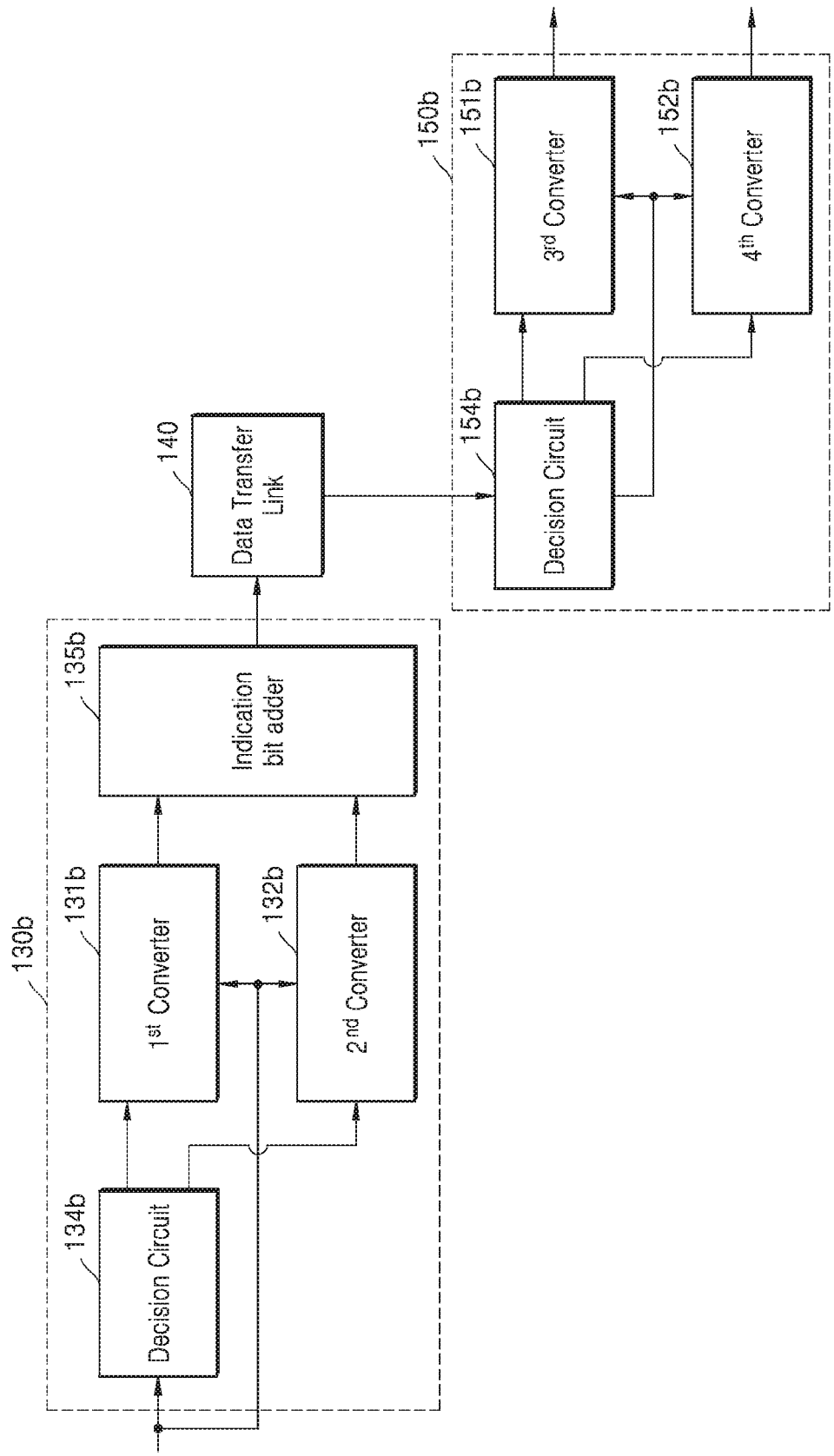
FIG. 7 is a block diagram for describing a data compressor performing a compression operation on the basis of a second compression manner and a data decompressor performing a decompression operation on the basis of a second decompression manner, according to an exemplary embodiment of the inventive concept.

FIG. 7 is a block diagram for describing a data compressor 130b performing a compression operation on the basis of the second compression manner and a data decompressor 150b performing a decompression operation on the basis of a second decompression manner, according to an exemplary embodiment of the inventive concept. The data compressor 130b and the data decompressor 150b may be used to implement the data compressor 130 and the data decompressor 150 of FIG. 1, respectively.

Referring to FIG. 7, the data compressor 130b compresses digital sample data on the basis of the second compression manner. That is, the data compressor 130b selects one conversion manner from among a plurality of conversion manners having different resolutions on the basis of an amplitude of a value of digital sample data included in a digital sample signal and performs the selected conversion on the digital sample data. In an exemplary embodiment, when the amplitude of the value of the digital sample data is greater than a threshold value, the data compressor 130b selects the first conversion manner from among a plurality of conversion manners, and when the amplitude of the value of the digital sample data is equal to or less than the threshold value, the data compressor 130b selects the second conversion manner from among the plurality of conversion manners. In an exemplary embodiment, the second conversion manner is a conversion manner having a resolution which is higher than that of the first conversion manner. For example, the first conversion manner may be a floating point conversion manner, and the second conversion manner may be a fixed point conversion manner. Also, assuming that the digital sample data includes I sample data and Q sample data, each of before-compression I sample data and Q sample data is K bits, a mantissa region corresponding to a data format in the floating point conversion manner is N bits, and an exponent region corresponding to the data format in the floating point conversion manner is N bits, a conversion manner may be selected based on the following Equation (1).

$$\max(|I|,|Q|) > 2^{N-1+\hat{M}} - 1 \qquad \text{Equation (1)}$$

In Equation (1), max(|I|, |Q|) may determine whether a largest value among an absolute value |I| of the I sample data and an absolute value |Q| of the Q sample data is greater than a threshold value $2^{N-1+\hat{M}}-1$. N may denote the number of bits of the mantissa region, M may denote the number of bits of the exponent region, and $\hat{M}$ may denote $$\left[\frac{M}{2}\right]$$

(a value corresponding to a quota obtained by dividing M by two). However, the threshold value of Equation (1) is merely an example as embodiments of the inventive concept are not limited thereto, and moreover, may be a criterion for selecting a conversion manner and may be variously set.

The data compressor 130b may select a conversion manner on the basis of a largest value among a plurality of pieces of digital sample data included in a certain digital sample data group. The digital sample data group may include the plurality of pieces of digital sample data and may be a unit of performing a conversion operation on the basis of a selected conversion manner. For example, when a first digital sample data group includes first I sample data, first Q sample data, second I sample data, and second Q sample data, the data compressor 130b selects a conversion manner on the basis of the first I sample data having a largest value and performs conversion on the first I sample data, the first Q sample data, the second I sample data, and the second Q sample data on the basis of the selected conversion manner. Subsequently, the data compressor 130b may select a conversion manner corresponding to a second digital sample data group and may perform conversion on second digital sample data on the basis of the selected conversion manner. In an exemplary embodiment, the number of pieces of digital sample data included in the digital sample data group may vary based on a communication environment or a communication condition of a wireless communication apparatus including the data compressor 130b. For example, the number of pieces of digital sample data included in the digital sample data group may be determined based on a variance of a data probability distribution of an input signal. In detail, it may be set that, as the variance of the data probability distribution of the input signal increases, the number of pieces of data included in the digital sample data group decreases. That is, in a case where the variance of the data probability distribution of the input signal is large, as the variance of the data probability distribution of the input signal increases, it may be difficult to apply the same conversion manner to the digital sample data group, and thus, based on the variance, the digital sample data group may be set to have the appropriate number of pieces of data. However, this is merely an exemplary embodiment, and the number of pieces of data of the digital sample data group may be set based on various manners and criterions.

The data compressor 130b includes a decision circuit 134b, a first converter 131b (e.g., a logic circuit), a second converter 132b (e.g., a logic circuit), and an indication bit adder 135b (e.g., an adding circuit). The first converter 131b may perform a conversion operation on the basis of the first conversion manner (for example, the floating point conversion manner), and the second converter 132b may perform a conversion operation on the basis of the second conversion manner (for example, the fixed point conversion manner). The decision circuit 134b may compare an amplitude of an I sample data value and an amplitude of a Q sample data value of digital sample data with the threshold value of Equation (1) to select a conversion manner. When a largest value among the absolute value |I| of the I sample data and the absolute value |Q| of the Q sample data is greater than the threshold value, the decision circuit 134b may select the first conversion manner to activate the first converter 131b. When the largest value among the absolute value |I| of the I sample data and the absolute value |Q| of the Q sample data is equal to or less than the threshold value, the decision circuit 134b may select the second conversion manner to activate the second converter 132b.

When the first converter 131b is activated, the first converter 131b may perform a conversion operation on each of the I sample data and the Q sample data on the basis of the first conversion manner, and when the second converter 132b is activated, the second converter 132b may perform a conversion operation on each of the I sample data and the Q sample data on the basis of the second conversion manner. In an embodiment, as described above, the first converter 131b may perform floating point conversion, corresponding to the predetermined number of bits of a mantissa region and the predetermined number of bits of an exponent region, on each of the I sample data and the Q sample data on the basis of a data probability distribution of an input signal. Also, the second converter 132b may additionally allocate some bits of the exponent region to the predetermined number of bits of the mantissa region in association with each of the I sample data and the Q sample data, and then, based thereon, the second converter 132b may perform a fixed point conversion. In an embodiment, the some bits of the exponent region additionally allocated to the number of bits of the mantissa region may be determined as $$\left[\frac{M}{2}\right]$$

of Equation (1). For example, when the predetermined number of bits of the mantissa region is 8 bits and the number of bits of the exponent region is 3 bits, the second converter 132b may additionally allocate some bits (for example, $$\left[\frac{3}{2}\right] = 1$$

bits) of the exponent region to the number of bits of the mantissa region and may perform a fixed point conversion on each of the I sample data and the Q sample data with a total of 9 bits.

In an exemplary embodiment, the indication bit adder 135b receives converted I sample data and converted Q sample data from the first converter 131b or the second converter 132b and adds an indication bit indicating a conversion manner to at least one of the converted I sample data and the converted Q sample data. For example, when the digital sample data is converted by the first converter 131b, the indication bit adder 135b may add 1-bit data having a value '0', and when the digital sample data is converted by the second converter 132b, the indication bit adder 135b may add 1-bit data having a value '1'. The indication bit adder 135b may receive information about a selected conversion manner from the decision circuit 134b.

A data transfer link 140 may transfer digital sample data, compressed by the data compressor 130b, to a data decompressor 150b. The data decompressor 150b may perform decompression on digital sample data compressed by the second decompression manner corresponding to the second compression manner. In an exemplary embodiment, the data decompressor 150b includes a decision circuit 154b, a third converter 151b (e.g., a logic circuit), and a fourth converter 152b (e.g., a logic circuit). The decision circuit 154b activates one of the third converter 151b and the fourth converter 152b on the basis of an indication bit of compressed digital sample data. In an embodiment, the third converter 151b corresponds to the first converter 131b, and the fourth converter 152b may correspond to the second converter 132b. That is, the third converter 151b may perform conversion on the basis of an inverse conversion manner of the above-described first conversion manner (for example, the floating point conversion manner) to decompress the compressed digital sample data, and the fourth converter 152b may perform conversion on the basis of an inverse conversion manner of the above-described second conversion manner (for example, the fixed point conversion manner) to decompress the compressed digital sample data. Digital sample data decompressed by the data decompressor 150b may be output to a processor (160 of FIG. 1). The embodiment of FIG. 7 corresponds to an exemplary configuration for convenience of description. However, embodiments of the present embodiment are not limited thereto. Various implementation embodiments for compressing digital sample data by using the above-described second compression manner and decompressing digital sample data by using the above-described second decompression manner may be applied to the data compressor 130b and the data decompressor 150b.

Figure 8A:
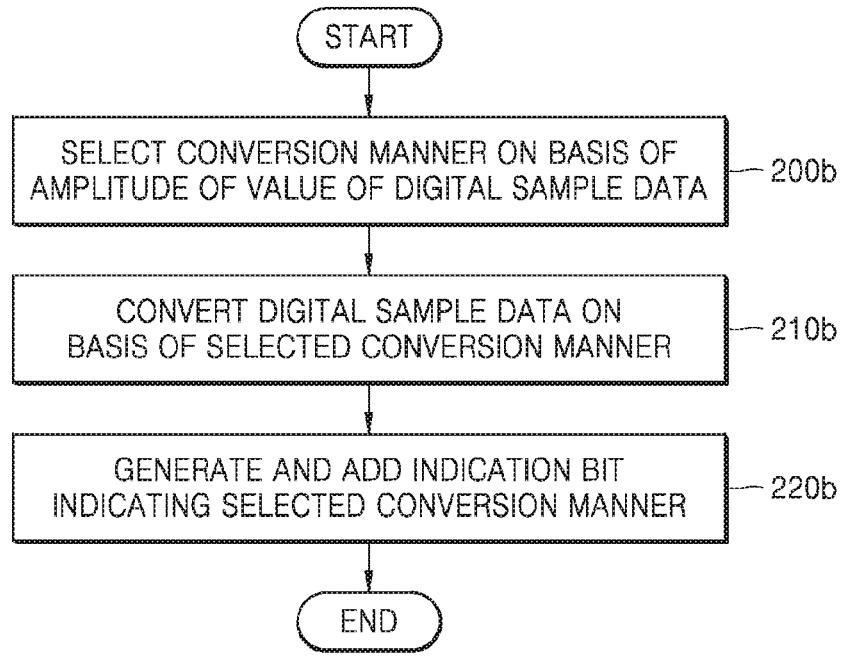
FIG. 8A is a flowchart for describing an operation of the data compressor of FIG. 7.
Figure 8B:
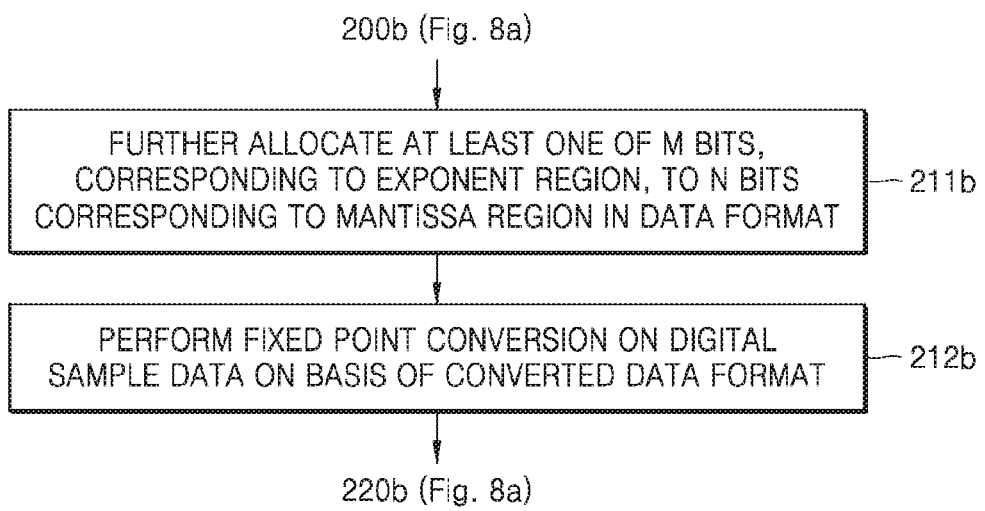
FIG. 8B is a flowchart for describing an operation of a second converter of FIG. 7.

FIG. 8A is a flowchart for describing an operation of the data compressor 130b of FIG. 7 according to an exemplary embodiment of the inventive concept, and FIG. 8B is a flowchart for describing an operation of the second converter 132b of FIG. 7. Hereinafter, description will be given with reference to FIG. 7.

Referring to FIG. 8A, in operation 200b, the data compressor 130b selects a conversion manner on the basis of an amplitude of a value of digital sample data. Subsequently, in operation 210b, the data compressor 130b converts the digital sample data on the basis of the selected conversion manner. In operation S220b, the data compressor 130b generates an indication bit indicating the selected conversion manner and adds the indication bit to converted digital sample data. Subsequently, the data transfer link 140 transfers digital sample data, compressed by the data compressor 130b, to the data decompressor 150b, and the data decompressor 150b may perform an inverse conversion corresponding to operation 210b on the basis of the indication bit to decompress the digital sample data.

Referring to FIG. 8B, at least one bit of M bits of the M-bit mantissa region corresponding to an N-bit exponent region corresponding to a mantissa region previously set for floating point conversion by the first converter 131b is further allocated to the N-bit exponent region in a data format for the second converter 132b performing a fixed point conversion in operation 211b subsequently to operation 200b (FIG. 8A). In operation 212b, the second converter 132b performs fixed point conversion on the digital sample data on the basis of a converted data format. Subsequently, operation 220b (FIG. 8A) may be performed.

Figure 9A:
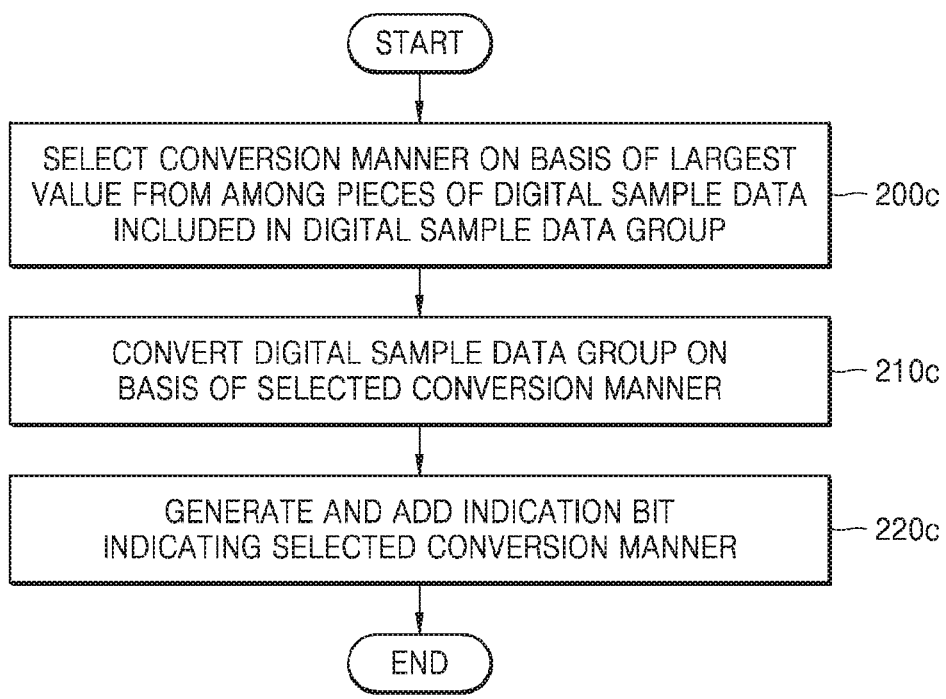
FIGS. 9A and 9B are flowcharts for describing an operation of a digital sample data group unit of the data compressor of FIG. 7, according to an exemplary embodiment of the inventive concept.
Figure 9B:
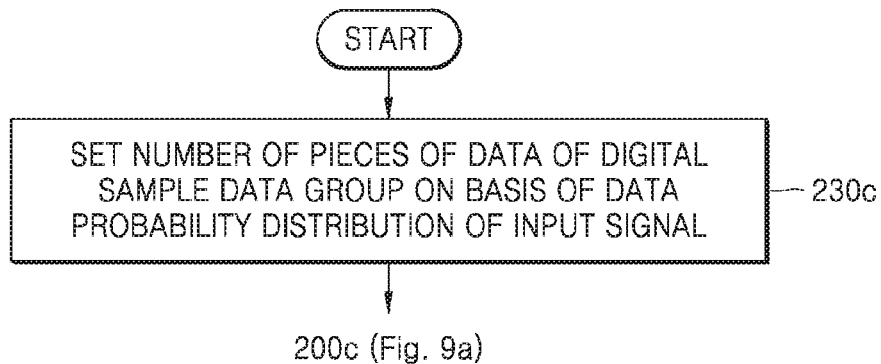

FIGS. 9A and 9B are flowcharts for describing an operation of a digital sample data group unit of the data compressor 130b of FIG. 7 according to an exemplary embodiment of the inventive concept. Hereinafter, a description will be given with reference to FIG. 7.

Referring to FIG. 9A, in operation 220c, the data compressor 130b selects a conversion manner on the basis of a largest value among a plurality of pieces of digital sample data included in a digital sample data group. In operation 210c, the data compressor 130b converts the digital sample data group on the basis of the selected conversion manner. In operation 220c, the data compressor 130b generates an indication bit indicating the selected conversion manner which is applied to the digital sample data group in common and adds the indication bit to a converted digital sample data group. Subsequently, the data transfer link 140 transfers the digital sample data group, compressed by the data compressor 130b, to the data decompressor 150b, and the data decompressor 150b performs an inverse conversion corresponding to operation 210c on the basis of the indication bit to decompress a compressed digital sample data group.

Referring to FIG. 9B, in operation 230c, the data compressor 130b sets the number of pieces of data of the digital sample data group on the basis of a data probability distribution of an input signal. In an exemplary embodiment, the data compressor 130b sets the number of pieces of data of the digital sample data group on the basis of a variance of the data probability distribution of the input signal. Subsequently, operation 200c (FIG. 9A) may be performed.

Figure 10:
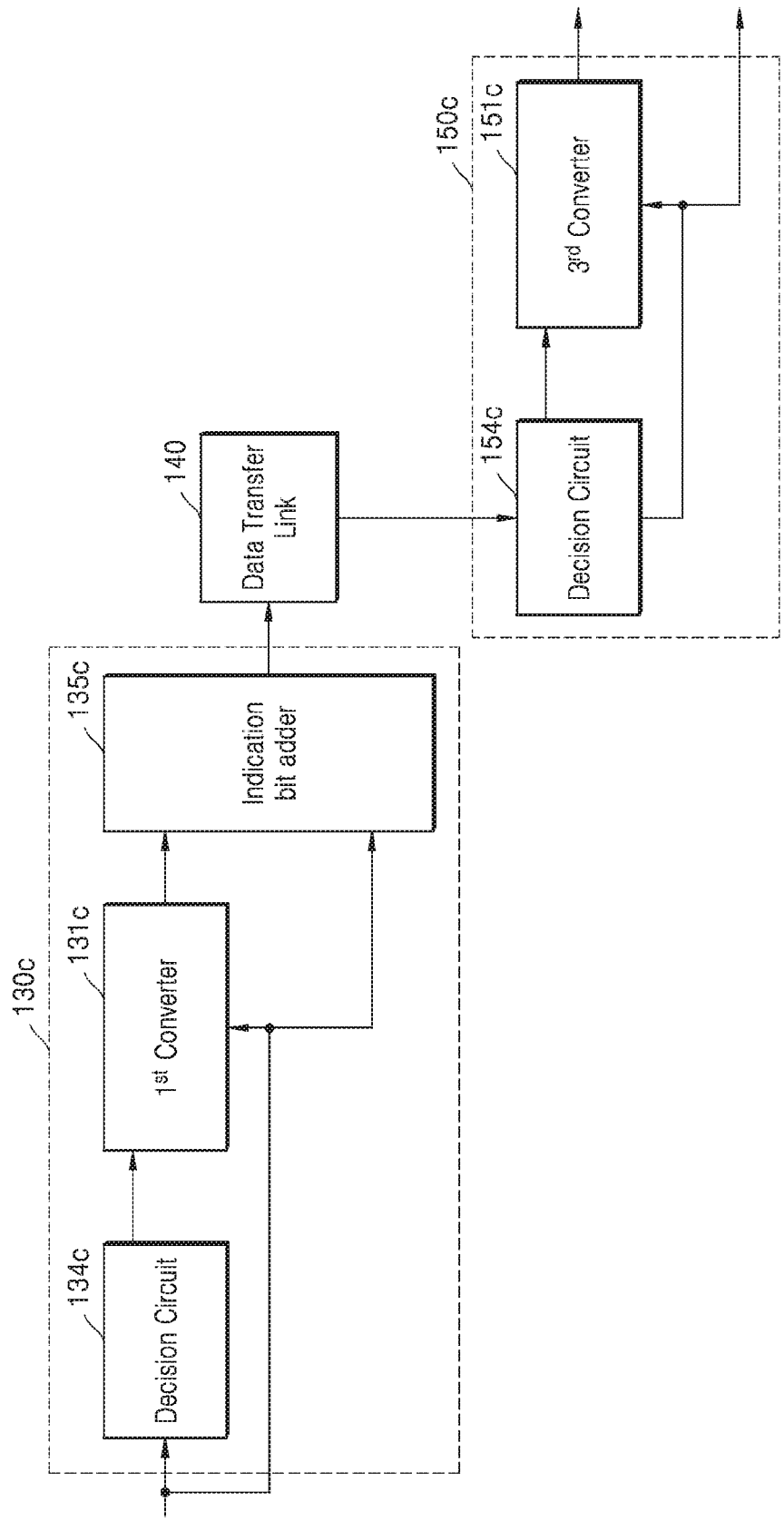
FIG. 10 is a block diagram for describing a data compressor performing a compression operation on the basis of a second compression manner and a data decompressor performing a decompression operation on the basis of a second decompression manner, according to an exemplary embodiment of the inventive concept.

FIG. 10 is a block diagram for describing a data compressor 130c performing a compression operation on the basis of the second compression manner and a data decompressor 150c performing a decompression operation on the basis of the second decompression manner, according to an exemplary embodiment of the invention.

Referring to FIG. 10, the data compressor 130c compresses digital sample data on the basis of the second compression manner. In an exemplary embodiment, when an amplitude of a value of the digital sample data is greater than a threshold value, the data compressor 130c selects a floating point conversion manner to perform conversion on the digital sample data, and when the amplitude of the value of the digital sample data is less than the threshold value, the data compressor 130c outputs the digital sample data without a separate conversion. For example, the data compressor 130c may output the digital sample data as it is or with an added bit to indicate it has not been converted. The threshold value has been described above with reference to FIG. 7, and thus, its detailed description is omitted.

In an exemplary embodiment, the data compressor 130c includes a decision circuit 134c, a first converter 131c (e.g., a logic circuit), and an indication bit adder 135c (e.g., an adder circuit). The first converter 131c may perform a conversion operation on the basis of a floating point conversion manner. The decision circuit 134c may compare an amplitude of an I sample data value and an amplitude of a Q sample data value of digital sample data with the threshold value of Equation (1) to select a conversion manner. When a largest value among the absolute value |I| of the I sample data and the absolute value |Q| of the Q sample data is greater than the threshold value, the decision circuit 134c may select the floating point conversion manner to activate the first converter 131c and may output the I sample data and the Q sample data to the first converter 131c. When the largest value among the absolute value |I| of the I sample data and the absolute value |Q| of the Q sample data is equal to or less than the threshold value, the decision circuit 134c may output the I sample data and the Q sample data to the indication bit adder 135c without a separate conversion.

When the first converter 131c is activated, the first converter 131c performs a conversion operation on each of the I sample data and the Q sample data on the basis of the floating point conversion manner. In an embodiment, as described above, the first converter 131c may perform floating point conversion, corresponding to the predetermined number of bits of a mantissa region and the predetermined number of bits of an exponent region, on each of the I sample data and the Q sample data on the basis of a data probability distribution of an input signal.

The indication bit adder 135c receives converted I sample data and converted Q sample data from the first converter 131c or receives bypassed I sample data and Q sample data, and may generate an indication bit indicating whether to perform a conversion operation on the I sample data and the Q sample data. The indication bit adder 135c may add the generated indication bit to received digital sample data.

A data transfer link 140 transfers digital sample data, output from the data compressor 130c, to the data decompressor 150c. The data decompressor 150c may process digital sample data, which is compressed by the data compressor 130c or is bypassed. For example, the processed the compressed digital simple data or the original data that was input to the decision circuit 134c. Hereinafter, digital sample data received by the data decompressor 150c is referred to as reception data.

In an exemplary embodiment, the data decompressor 150c includes a decision circuit 154c and a third converter 151c (e.g., a logic circuit). The decision circuit 154c may activate the third converter 151c on the basis of an indication bit of reception data. In an embodiment, the third converter 151c corresponds to the first converter 131b, and the third converter 151c performs a conversion operation on the reception data on the basis of an inverse conversion manner of the floating point conversion manner and may output converted reception data to a processor (160 of FIG. 1). Also, the decision circuit 154c may bypass the reception data on which a separate conversion operation is not performed and may output the reception data to the processor (160 of FIG. 1). For example, if the reception data has not been compressed, the decision circuit 154c output the reception data to the processor without outputting it to the third converter 151c. The embodiment of FIG. 10 corresponds to an exemplary configuration for convenience of description. However, embodiments of the present embodiment are not limited thereto. Various implementation embodiments for compressing digital sample data by using the above-described second compression manner and decompressing digital sample data by using the above-described second decompression manner may be applied to the data compressor 130c and the data decompressor 150c.

Figure 11:
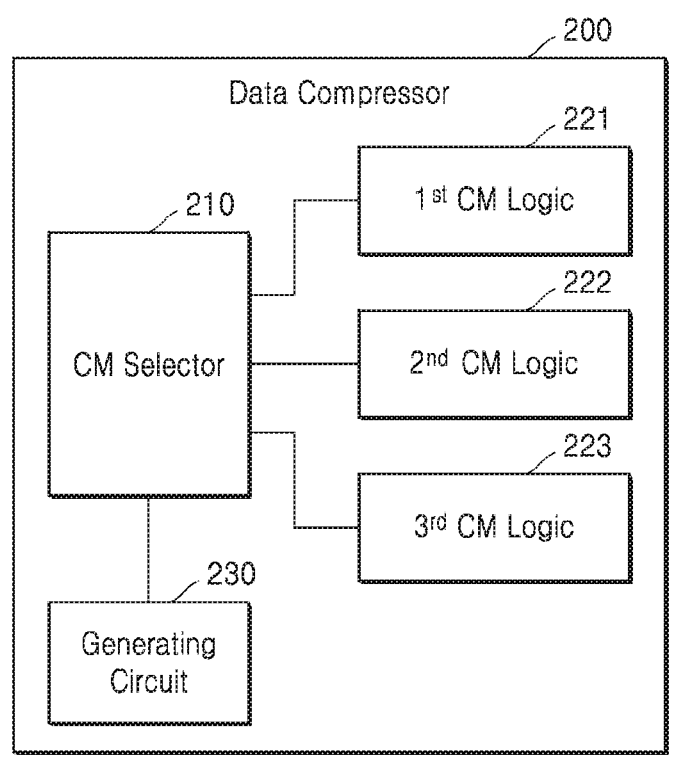
FIGS. 11 to 13 are diagrams for describing a method of selecting a compression manner, according to an exemplary embodiment of the inventive concept.
Figure 12:
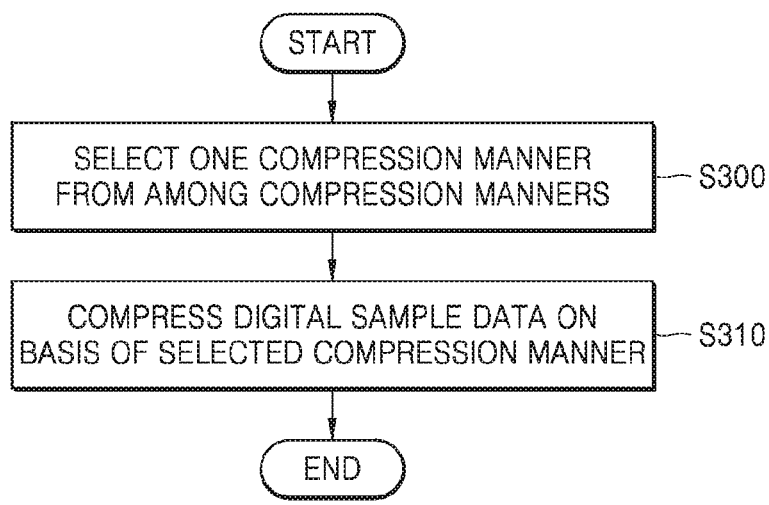
Figure 13:
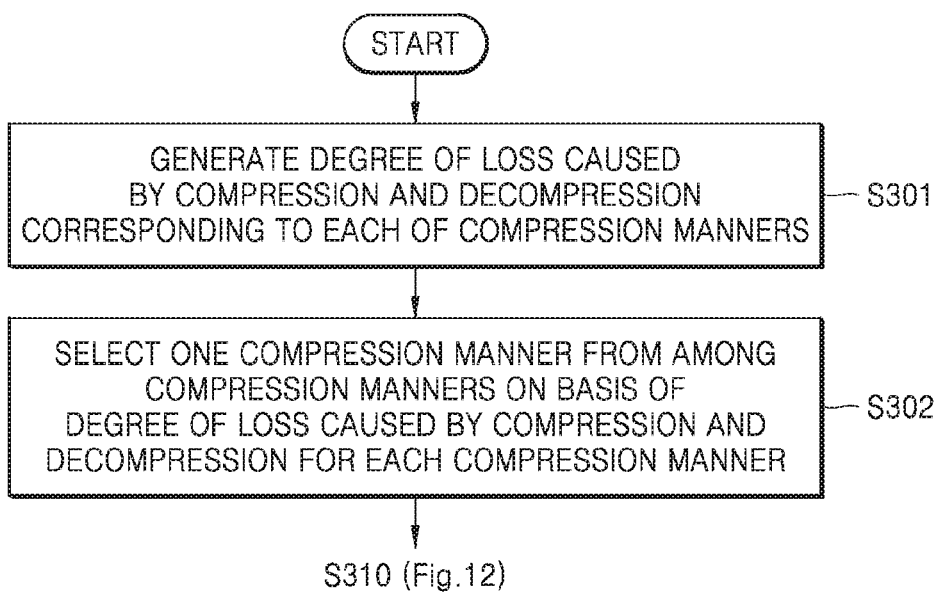

FIGS. 11 to 13 are diagrams for describing a method of selecting a compression manner, according to an exemplary embodiment of the inventive concept.

Referring to FIG. 11, a data compressor 200 include a compression manner (CM) selector 210 (e.g., a selection circuit, a multiplexer, etc.), first to third compression logics 221 to 223 (e.g., logic circuits), and a generating circuit 230. The first to third compression logics 221 to 223 compress digital sample data on the basis of different compression manners. For example, the first compression logic 221 may compress the digital sample data on the basis of the first compression manner described above with reference to FIG. 6A, the second compression logic 222 may compress the digital sample data on the basis of the second compression manner described above with reference to FIG. 7 or 10, and the third compression logic 223 may compress the digital sample data on the basis of a third compression manner that combines the first compression manner with the second compression manner. However, this is merely an exemplary embodiment, and the inventive concept is not limited thereto. The first to third compression logics 221 to 223 may be implemented to perform a compression operation on the basis of different compression manners in addition to the above-described compression manners, and moreover, the data compressor 200 may include more or fewer compression logics. Also, in FIG. 11, it is illustrated that the first to third logics 221 to 223 are implemented as separate logics, but the first to third logics 221 to 223 may share some elements.

The compression manner selector 210 may select an optimal compression manner from among the first to third compression manners on the basis of at least one of a communication environment, an operation mode, and a desired performance value of a wireless communication apparatus including the data compressor 200, and then, may operate based on the selected optimal compression manner. In an exemplary embodiment, the compression manner selector 210 selects a compression manner on the basis of an error vector magnitude (EVM) representing a degree of loss caused by compression and decompression. EVM may be defined according to the following Equation (2).

$$EVM = \frac{1}{N_S} \sum_{k=1}^{N_S} \frac{|x_k - \hat{x}_k|^2}{P_{avg}}$$ Equation (2)

In Equation (2), $P_{avg}$ may denote an average power corresponding to an input signal, $x_k$ may denote $k^{th}$ original digital sample data, $\hat{x}_k$ may denote $k^{th}$ decompressed digital sample data, and $N_S$ may denote the number of pieces of digital sample data used to measure the EVM. Digital sample data used to measure EVM may be referred to as test sample data.

In an embodiment, the generating circuit 230 measures an EVM of each of the first to third compression logics 221 to 223 by using a plurality of pieces of test sample data to generate information about the EVM. Also, the generating circuit 230 may predict the EVM of each of the first to third compression logics 221 to 223 to generate the information about the EVM. In an exemplary embodiment, the generating circuit 230 predicts the EVM of each of the first to third compression logics 221 to 223 on the basis of a compression-decompression loss parameter corresponding to each of the first to third compression manners and a variance parameter of a data probability distribution of an input signal. The compression-decompression loss parameter may be defined as representing a degree of compression-decompression loss, which is predetermined for each compression manner on the basis of various communication environments or communication conditions of a wireless communication apparatus. The various communication environments or communication conditions may include a target signal-to-noise ratio (SNR), an internal data transfer speed, a desired compression rate, the total amount of allowable transfer bits, and a target system performance of the wireless communication apparatus. The variance parameter of the data probability distribution of the input signal may represent a degree of variance of the data probability distribution of the input signal.

The compression manner selector 210 may receive the information about the EVM from the generating circuit 230 and may select a compression manner on the basis of the information about the EVM. For example, the compression manner selector 210 may select a compression manner corresponding to a minimum EVM with reference to the information about the EVM.

In an embodiment, the generating circuit 230 selects a compression manner by further using the information about the EVM and a target SNR and allowable SNR loss needed for the wireless communication apparatus. The target SNR, the allowable SNR loss, and the EVM may be defined according to the following Equation (3).

$$SNR_{loss} \geq SNR_{target} - \frac{SNR_{target}}{EVM \cdot SNR_{target} - 1}$$ Equation (3)

In Equation (3), $SNR_{loss}$ may denote allowable SNR loss, and $SNR_{target}$ may denote a target SNR.

In an embodiment, the compression manner selector 210 selects a compression manner on the basis of whether a value obtained through an arithmetic operation based on the EVM and the target SNR "$SNR_{target}$" matches a condition within the predetermined allowable SNR loss "$SNR_{loss}$". Also, when there are a plurality of compression manners having an EVM satisfying the condition of Equation (3), the compression manner selector 210 may select a compression manner having a maximum compression rate from among the plurality of compression manners. However, this is merely an exemplary embodiment, and the inventive concept is not limited thereto. In addition to Equation (3), various metrics for selecting an optimal compression manner may be set.

The compression manner selector 210 and the generating circuit 230 may each include a calculation circuit which measures or predicts an EVM and performs an arithmetic operation needed for selecting a compression manner. In some embodiments, the compression manner selector 210 and the generating circuit 230 may be implemented as one block.

The compression manner selector 210 selects one compression manner from among the first to third compression manners and activates a compression logic corresponding to the selected compression manner among the first to third compression logics 221 to 223, thereby allowing the activated compression logic to perform a compression operation on digital sample data. Subsequently, digital sample data compressed by the selected compression logic may be decompressed based on a decompression manner corresponding thereto and may be provided to a processor.

Referring to FIG. 12, in operation S300, the compression manner selector 210 selects one compression manner from among a plurality of compression manners. As described above with reference to FIG. 11, the compression manner selector 210 may select a compression manner on the basis of a degree of loss caused by compression and decompression corresponding to each of the plurality of compression manners, or may select a compression manner currently suitable for a wireless communication apparatus by using various methods such as selecting a compression manner satisfying Equation (3). In operation S310, a compression logic selected by the compression manner selector 210 compresses digital sample data on the basis of the selected compression manner.

Referring further to FIG. 13, in operation S301, the generating circuit 301 generates a degree of loss caused by compression and decompression corresponding to each of the plurality of compression manners. For example, the generating circuit 301 may generate an EVM representing the degree of loss caused by compression and decompression. The compression manner selector 210 may select one compression manner from among the plurality of compression manners on the basis of the degree of loss caused by compression and decompression for each compression manner. Subsequently, operation S310 (FIG. 12) may be performed.

Figure 14:
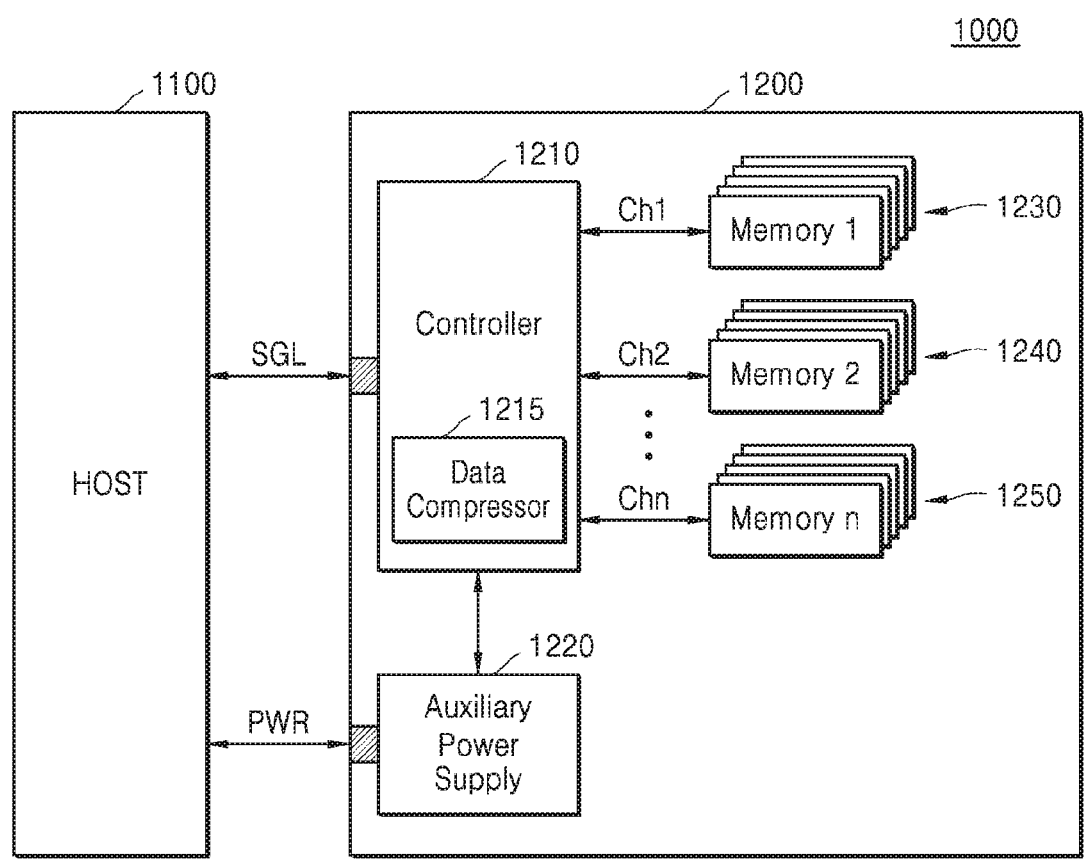
FIG. 14 is a block diagram illustrating a storage system according to an exemplary embodiment of the inventive concept.

FIG. 14 is a block diagram illustrating a storage system 1000 according to an exemplary embodiment of the inventive concept.

Referring to FIG. 14, the storage system 1000 includes a host 1100 (e.g., a host device) and a storage device 1200. The storage device 1200 may transmit or receive a signal SGL to or from the host 1100 through a signal connector and may be supplied with power PWR through a power connector. In an exemplary embodiment, the storage device 1200 includes a controller 1210 (e.g., a control circuit), an auxiliary power supply 1220, and a plurality of memory devices 1230, 1240, and 1250.

The controller 1210 includes a data compressor 1215 to which the embodiments are applied, and the data compressor 1215 may compress data on the basis of a suitable compression manner based on an environment or a data transmission/reception state between the host 1100 and the storage device 1200 and may provide compressed data to the memory devices 1230, 1240, and 1250 through channels Ch1 to Chn. Any of data compressors 130, 130a, 130b, 130c, or 200 may be used to implement the data compressor 1215. Furthermore, based on a state of each of the channels Ch1 to Chn, the data compressor 1215 may change a compression manner for each memory device and may perform a compression operation on data. Also, although not shown in FIG. 14, the controller 1210 or each of the memory devices 1230, 1240, and 1250 may further include a data decompressor (not shown) corresponding to the data compressor 1215 and may perform a data decompression operation. For example, the data decompressor may be implemented by any one of data decompressors 150, 150a, 150b, 150c.

Figure 15:
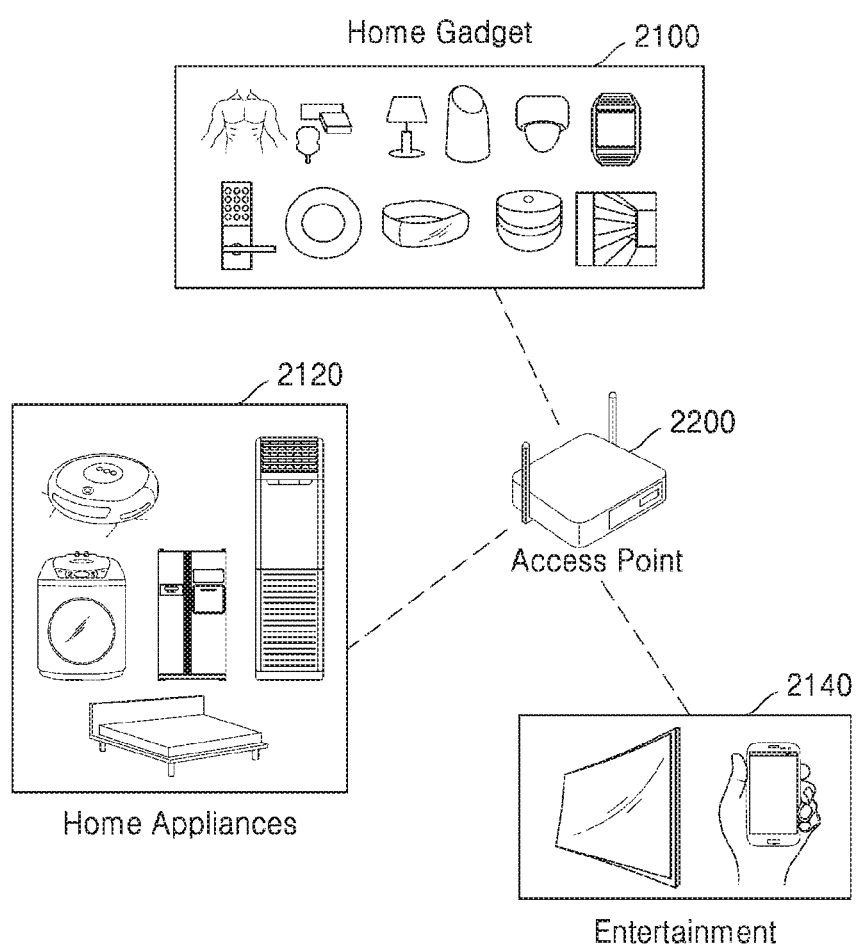
FIG. 15 is a diagram illustrating communication apparatuses including a data compressor or a data decompressor, according to an exemplary embodiment of the inventive concept.

FIG. 15 is a diagram illustrating communication apparatuses including a data compressor or a data decompressor, according to an exemplary embodiment of the inventive concept.

Referring to FIG. 15, home gadget 2100, home appliances 2120, entertainment equipment 2140, and an access point (AP) 2200 may each include the data compressor or the data decompressor according to the above-described embodiments. In some embodiments, the home gadget 2100, the home appliances 2120, the entertainment equipment 2140, and the AP 2200 may configure an Internet of things (IoT) network system. Communication devices illustrated in FIG. 15 are merely an exemplary embodiment. Accordingly, it is to be understood that the wireless communication apparatus according to the embodiments may be included in other communication devices which are not illustrated in FIG. 15.

While the inventive concept has been particularly shown and described with reference to embodiments thereof, it will be understood that various changes in form and details may be made therein without departing from the spirit and scope of the inventive concept.

What is claimed is:

1. A wireless communication apparatus comprising:
a radio frequency integrated circuit (RFIC) configured to receive an input signal to generate a digital sample signal from the input signal;
a data compressor compressing the digital sample signal according to a compression manner based on a data probability distribution of the input signal to generate a compressed digital sample signal;
a data decompressor configured to decompress the compressed digital sample signal on the basis of a decompression manner corresponding to the compression manner to generate a decompressed digital sample signal;
a data transfer link configured to transfer the compressed digital sample signal to the data decompressor; and
a processor configured to process the decompressed digital sample signal,
wherein the compressing determines a receivable signal amplitude range of the RFIC, selects a data probability distribution that corresponds to the receivable signal amplitude range from among a plurality of different data probability distributions, determines a value of bit data of an exponent region associated with a data value of the digital sample data as a value of an amplitude region of the selected data probability distribution in which the data value falls, determines a value of bit data of a mantissa region associated with the data value based on the determined value, and performs a floating point conversion on the digital sample data to have a data format suitable for a number of bits of the mantissa region and a number of bits of the exponent region,
wherein the data compressor is configured to perform truncation on the digital sample data to generate truncated sample data and perform the floating point conversion on the truncated sample data on the basis of a point at which a value of the truncated sample data is in the data probability distribution of the input signal.

2. The wireless communication apparatus of claim 1, wherein the data compressor is configured to adjust a value of the exponent region determining a resolution on the basis of a data probability corresponding to the value of the digital sample data to perform the floating point conversion.

3. The wireless communication apparatus of claim 1, wherein a number of bits corresponding to the exponent region in the floating point conversion is determined based on a data probability distribution having a largest variance among a plurality of data probability distributions of the input signal based on a plurality of receivable signal amplitude ranges in the RFIC.

4. The wireless communication apparatus of claim 1, wherein the truncation is a least significant bit (LSB) truncation.

5. The wireless communication apparatus of claim 1, wherein the data compressor is configured to select one conversion from among a floating point conversion and a fixed point conversion on the basis of an amplitude of a value of the digital sample data comprised in the digital sample signal and perform the selected conversion on the digital sample data.

6. The wireless communication apparatus of claim 5, wherein the digital sample data comprises in-phase (I) sample data and quadrature (Q) sample data, and the data compressor is configured to select the one conversion from among the floating point conversion and the fixed point conversion on the basis of sample data having a largest value among the I sample data and the Q sample data and perform the selected conversion on the I sample data and the Q sample data in common.

7. The wireless communication apparatus of claim 5, wherein the data compressor is configured to perform the floating point conversion on the digital sample data on the basis of a data format comprising N bits corresponding to the mantissa region and M bits corresponding to the exponent region when an amplitude of a value of the digital sample data is greater than a threshold value, where N and M are integers of 1 or more.

8. The wireless communication apparatus of claim 7, wherein the data compressor is configured to perform the fixed point conversion on the digital sample data on the basis of a data format where at least one of the M bits is further allocated to the N bits when the amplitude of the value of the digital sample data is equal to or less than the threshold value.

9. The wireless communication apparatus of claim 5, wherein the data compressor is configured to generate an indication bit indicating a selected conversion among the floating point conversion and the fixed point conversion, and the data compressor is configured to decompress converted digital sample data on the basis of a decompression manner corresponding to the selected conversion with reference to the indication bit.

10. The wireless communication apparatus of claim 1, wherein the data compressor is configured to select one conversion from among floating point conversion and fixed point conversion on the basis of a largest value among a plurality of pieces of the digital sample data comprised in a digital sample data group of the digital data signal and perform the selected conversion on the digital sample data group.

11. An operating method of a wireless communication apparatus, the operating method comprising:
- analog-to-digital converting a received input signal into a digital sample signal;
- compressing the digital sample signal according to a compression manner based on a data probability distribution of the input signal to generate a compressed digital sample signal;
- transferring the compressed digital sample signal to be processed;
- decompressing the compressed digital sample signal on the basis of a decompression manner corresponding to the compression manner; and
- processing the decompressed digital sample signal;

wherein the compressing of the digital sample signal comprises:
- determining a receivable signal amplitude range of the wireless communication apparatus;
- selecting a data probability distribution that corresponds to the receivable signal amplitude range from among a plurality of different data probability distributions;
- determining a value of bit data of an exponent region associated with a data value of the digital sample data to an exponent value of an amplitude region of the selected data probability distribution in which the data value falls;
- performing truncation on the digital sample data to generate truncated sample data; and
- performing a floating point conversion on the digital sample data to have a data format suitable for a number of bits of the mantissa region and a number of bits of the exponent region where the floating point conversion is performed on the truncated sample data on the basis of a point at which a value of the truncated sample data is in the data probability distribution of the input signal.

12. The wireless communication apparatus of claim 1, wherein a sum of the number of bits of the mantissa region and the number of bits of the exponent region is less than a number of bits of the digital sample signal before the floating point conversion.

13. The operating method of claim 11, wherein a sum of the number of bits of the mantissa region and the number of bits of the exponent region is less than a number of bits of the digital sample signal before the floating point conversion.

14. The operating method of claim 11, wherein a number of bits corresponding to the exponent region in the floating point conversion is determined based on a data probability distribution having a largest variance among a plurality of data probability distributions of the input signal based on a plurality of receivable signal amplitude ranges in a radio frequency integrated circuit (RFIC) configured to receive the input signal.

15. The operating method of claim 11,
wherein the truncation is a least significant bit (LSB) truncation.

16. The operating method of claim 15, wherein the digital sample data comprises in-phase (I) sample data and quadrature (Q) sample data, and further comprising selecting the one conversion from among the floating point conversion and the fixed point conversion on the basis of sample data having a largest value among the I sample data and the Q sample data and performing the selected conversion on the I sample data and the Q sample data in common.

17. The operating method of claim 15, wherein the floating point conversion is performed on the digital sample data on the basis of a data format comprising N bits corresponding to the mantissa region and M bits corresponding to the exponent region when an amplitude of a value of the digital sample data is greater than a threshold value, where N and M are integers of 1 or more.

* * * * *